United States Patent
Callaway, Jr. et al.

(10) Patent No.: US 6,275,500 B1
(45) Date of Patent: Aug. 14, 2001

(54) METHOD AND APPARATUS FOR DYNAMIC CONTROL OF TALK GROUPS IN A WIRELESS NETWORK

(75) Inventors: Edgar Herbert Callaway, Jr., Boca Raton; Christopher T. Thomas, Fort Lauderdale, both of FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/370,539

(22) Filed: Aug. 9, 1999

(51) Int. Cl.[7] .............................. H04L 12/42; H04B 7/00; H04Q 7/20; G05B 23/02; H04J 3/00
(52) U.S. Cl. .................. 370/449; 370/346; 455/519; 340/825.08
(58) Field of Search ................................. 370/346, 458, 370/464, 465, 468, 447, 449, 450, 457; 455/518, 519, 11.1, 13.1; 340/825, 825.06, 825.07, 825.08

(56) References Cited

U.S. PATENT DOCUMENTS

| | | | |
|---|---|---|---|
| 4,872,003 | * 10/1989 | Yoshida | 370/439 |
| 4,924,461 | * 5/1990 | Amemiya et al. | 370/449 |
| 5,130,983 | * 7/1992 | Heffner, III | 370/449 |
| 5,473,605 | * 12/1995 | Grube et al. | 370/261 |
| 5,485,464 | * 1/1996 | Strodtbeck et al. | 370/319 |
| 5,796,827 | 8/1998 | Coppersmith | 380/9 |
| 5,815,660 | * 9/1998 | Momona | 709/208 |
| 5,896,561 | * 4/1999 | Schrader et al. | 370/445 |
| 5,898,831 | 4/1999 | Hall | 340/825.22 |
| 5,909,183 | 6/1999 | Borgstahl | 713/201 |

\* cited by examiner

Primary Examiner—Huy D. Vu
Assistant Examiner—Kevin C. Harper
(74) Attorney, Agent, or Firm—Randi L. Dulaney

(57) ABSTRACT

A transceiver device (50) acting as a master (2) among a plurality of communication devices (1 and 12) potentially acting as slaves to the master (2). The transceiver device (50) includes a transmitter (68), a receiver (54) coupled to the transmitter (68), and a processor (58) coupled to the transmitter (68) and the receiver (54). The processor (58) is programmed to poll the slaves at a first interval and then receive a communication request while polling from a first slave of the plurality of communication devices to communicate with at least a second slave of the plurality of communication devices. The master (2) then designates communication parameters for communication between the first slave and at least the second slave and then polls at a re-polling interval the first slave and at least the second slave to confirm the termination of communication between the first slave and at least the second slave.

13 Claims, 6 Drawing Sheets

METHOD AND APPARATUS FOR DYNAMIC CONTROL OF TALK GROUPS IN A WIRELESS NETWORK

FIELD OF THE INVENTION

The present invention is directed to master and slave communication devices, and more particularly to slave devices that may communicate amongst themselves without intercession of the master.

BACKGROUND OF THE INVENTION

Short range wireless communication and personal area networks will soon proliferate in common household products as well as mobile business products. Currently many products that have wireless capability are incompatible. Bluetooth technology allows for the replacement of the many proprietary cables that connect one device to another with one universal short-range radio link. Bluetooth technology could replace the cumbersome cables used today to connect a laptop to a cellular telephone or between other devices such as printers, PDA's, desktops, fax machines, keyboards, joysticks or virtually any other digital device. Refrigerators, microwave ovens, dish washers, laundry washers & dryers, stereo, television, digital video disks, video games, lighting, irrigation, cooling and heating systems among others may also take advantage of such short-range radio links.

Bluetooth radio technology further provides a universal bridge to existing data networks, a peripheral interface, and a mechanism to form small private ad hoc groupings of connected devices away from fixed network infrastructures. Designed to operate in a noisy radio frequency environment, the Bluetooth radio uses frequency hopping scheme to make the link robust. Bluetooth radio modules avoid interference from other signals by hopping to a new frequency after transmitting or receiving a data packet. One drawback of the current Bluetooth technology is the reliance on the master device to act as an intermediary between all other communication devices acting as slaves to the master device. This requirement that single device be a part of all communications reduces throughput throughout the entire system.

The Bluetooth system supports both point-to-point and point-to-multi-point connections, but the current specification limits the number of slave devices that a master can control to seven devices. Referring to FIG. 1, a standard Bluetooth 1.0 system or piconet 15 is shown having a control channel or master device 2 with several slave devices, namely devices 1, 3, 4, 5, 6, 8, and 9. Note, that although devices 7 and 10 are within range to form a portion of the piconet 15, the master device 2 would need to cease communications with two of the slave devices (from 1, 3, 4, 5, 6, 8, and 9) under the Bluetooth 1.0 standard in order to control and communicate with slave devices 7 and 10. Several Piconets can be established and linked together ad hoc, where each Piconet is identified by a different frequency hopping sequence, but again a limit is placed on the total number of devices linked. All users participating on the same Piconet are synchronized to the same hopping sequence.

Although the Bluetooth radio is more robust than other systems operating in the same frequency band (particularly since the Bluetooth radio typically hops faster and uses shorter packets), the current Bluetooth system still needs a method and system for efficiently and dynamically controlling talk groups created from groups of slave devices operating under control of a master device. In other words, there is a need for a system that has higher data transfer efficiency between slaves that eliminates bottlenecks at the master. Ideally, such a system can be compatible with Bluetooth 1.0 requirements such as high data rate, peer-to-peer networking, and low cost, but such compatibility should not be considered a limitation in accordance with the claimed invention.

DETAILED DESCRIPTION

Figure 1:
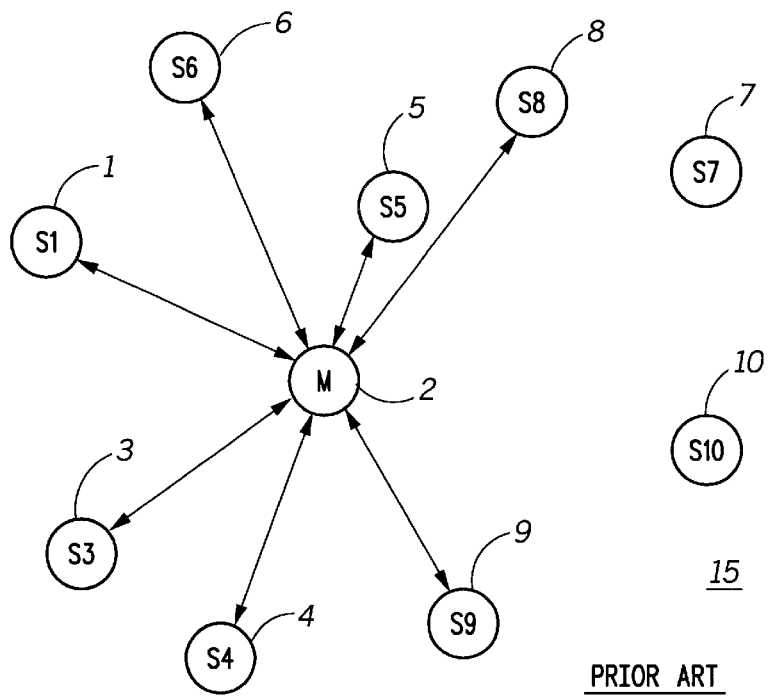
FIG. 1 is a block diagram of wireless network system currently found in accordance with the Bluetooth 1.0 system specifications.
Figure 2:
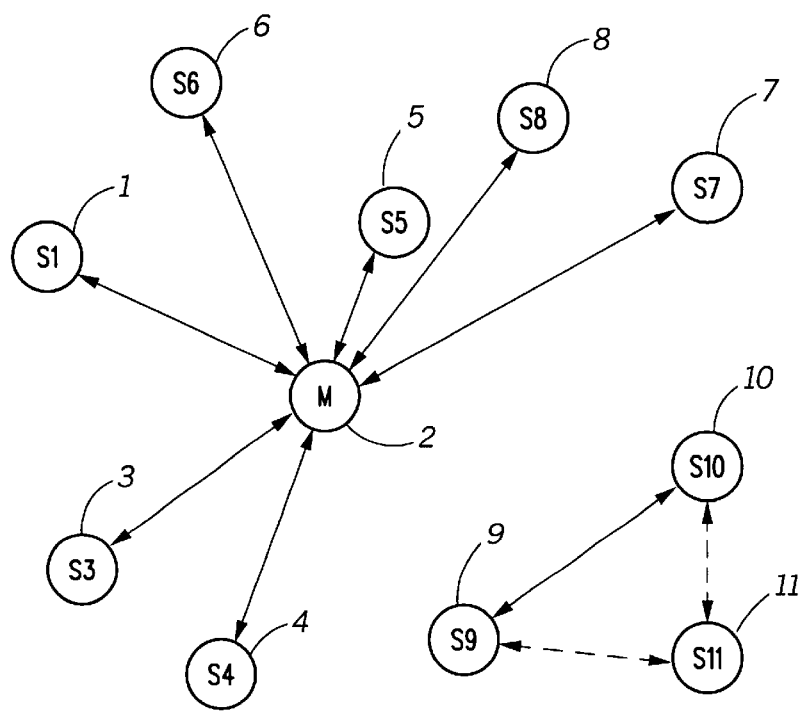
FIG. 2 is a block diagram of a wireless network system in accordance with the present invention.

Referring to FIG. 2, there is shown a wireless network 20 in accordance with the present invention where seven slave devices (1, 3–8) are communicating with the master 2 on a first communication resource or first channel and all these slave devices are polled at a first interval. In addition, in accordance with the present invention, other slave devices (9, 10 and 11) are in a "parked" mode where they are allowed to communicate with each other, preferably on a second communication resource or second channel. While the slave devices are communicating with each other on a second channel, the master places the slaves in a "parked" mode in which the master polls the slaves at a second interval which is preferably longer than the first polling interval the master uses on the remaining "unparked" slaves (1, 3–8). It should be noted that under prior schemes (such as the Bluetooth 1.0 system), the parked devices do not communicate with each other; the master must act as an intermediary for all slave-to-slave communications under such schemes. In the present invention, the master can set up multiple "parked" slave groups or talk groups that may communicate among themselves and control an indefinite number of communicating slaves within a network. Thus, the present invention achieves higher system throughput with multiple slave talk groups communicating at higher speeds without the intercession of the master.

Referring to FIGS. 3–11, the steps used by a communication system having a transceiver acting as a master 2 and a plurality of communication devices (1 and 12) each potentially acting as slaves to the master is shown. Preferably, the master 2 performs the functions of vectoring slaves to other frequencies, modulation formats, hop sequences, spread sequences, etc., where high data rate communication may occur. The master 2 is able to maintain control of the vectored slaves preferably by using the parked mode where the master polls the slaves at a less frequent interval as the slaves independently communicate among themselves. The master polls the slaves to receive status reports on the slaves' independent communication, e.g., that communication among the slaves has terminated, and also so that the master may maintain control of the vectored slaves.

Figure 3:
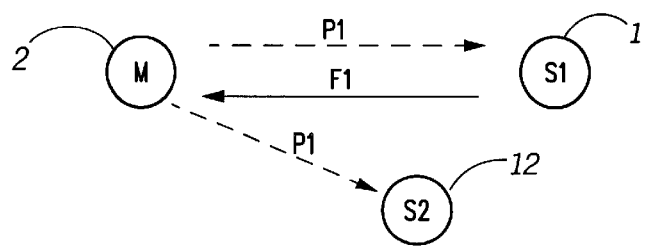
FIG. 3 is a block diagram of a portion of a wireless network system where a master polls a slave and a slave replies a first communication resource in accordance with the present invention.
Figure 4:
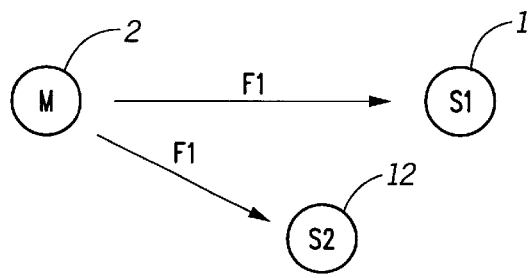
FIG. 4 is a block diagram of a portion of a wireless network system where the master requests the slaves to move to a second communication resource in accordance with the present invention.

Referring to FIG. 3, the master 2 is shown polling the slaves 1 and 12 at a first interval P1 on a first communication resource F1 and slave 1 responding on the first communication resource. Under the standard Bluetooth 1.0 polling by the master at 2.4 GHz, slave 1 is shown requesting a link (preferably a high speed link) to at least a second slave 12 among a plurality of slaves (not shown). Referring to FIG. 4, the master 2 then designates communication resource parameters for communication between the first slave 1 and at least the second slave 12. The aster 2 on the first communication resource requests that the slaves move to a second communication resource to exchange data using the assigned parameters such as frequency, modulation, protocol, data rate, etc. In addition, the master 2 assigns a second polling interval or a re-polling interval to maintain some form of communication and control over the slaves as will become more apparent.

Figure 5:
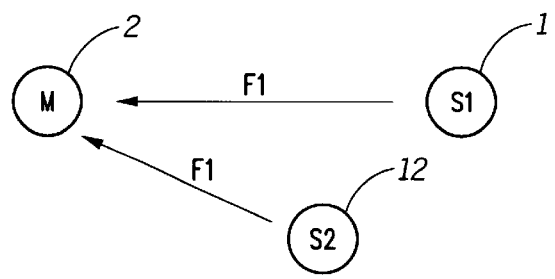
FIG. 5 is a block diagram of a portion of a wireless network system where the slaves acknowledge the master's request on the first communication resource in accordance with the present invention.
Figure 6:
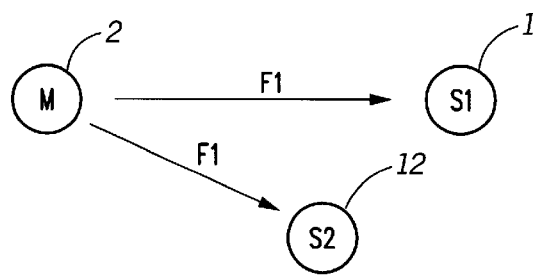
FIG. 6 is a block diagram of a portion of a wireless network system where the master directs the slaves to move to the second communication resource in accordance with the present invention.

Preferably, in a future Bluetooth scenario, the slaves would move to a high speed channel at 5.8 GHz to exchange data. Referring to FIG. 5, the slaves then acknowledge on the first communication resource (preferably at 2.4 GHz) their agreement to the parameters assigned by the master. This step is necessary since there may be devices in a network that may be incapable of communicating at the assigned parameters. Once the slaves acknowledge the assigned parameters, the master, still operating on the first communication resource, then directs the slaves to the second communication resource (or high speed channel) to exchange data as shown in FIG. 6. The master in essence initiates the start of communication between the first slave and at least the second slave after the step of receiving an acknowledgement and thus creates a slave talk group. It should be understood that the master can "initiate" multiple slave talk groups by directing the start of communication among a remainder of slaves (see FIG. 2) or among the first slave 1 and the remainder of slaves or among at least the second slave 12 and the remainder of slaves.

Figure 7:
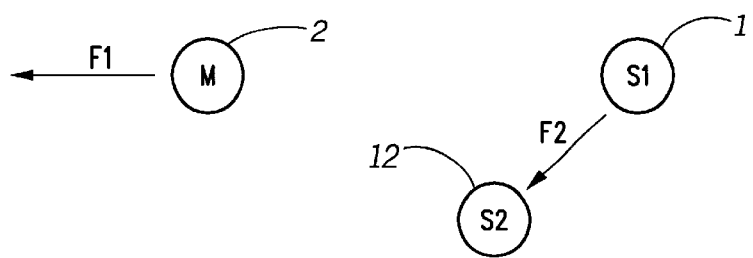
FIG. 7 is a block diagram of a portion of a wireless network system where one slave communicates with another slave on the second communication resource in accordance with the present invention.
Figure 8:
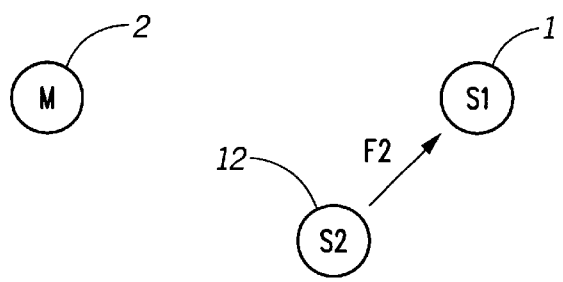
FIG. 8 is a block diagram of a portion of a wireless network system where a slave acknowledges another slave's communication in accordance with the present invention.
Figure 9:
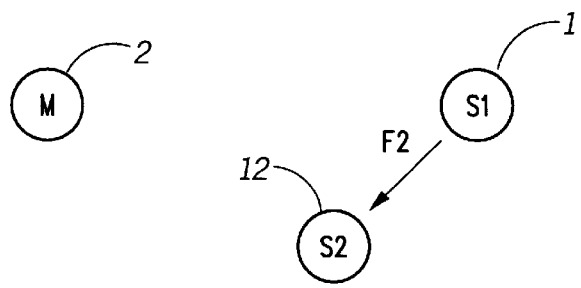
FIG. 9 is a block diagram of a portion of a wireless network system where one slave communicates a desire to terminate with another slave on the second communication resource in accordance with the present invention.
Figure 10:
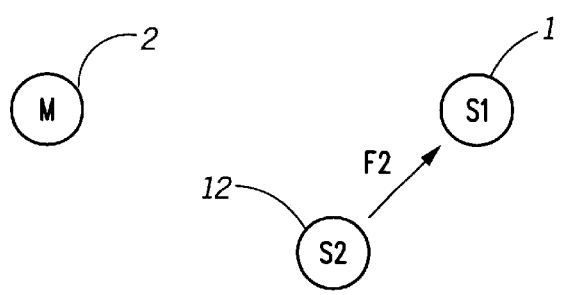
FIG. 10 is a block diagram of a portion of a wireless network system where one slave acknowledges another slave's desire to terminate in accordance with the present invention.
Figure 11:
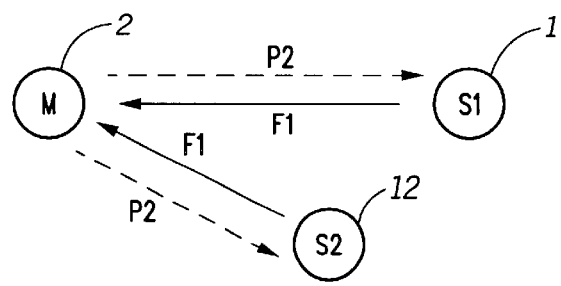
FIG. 11 is a block diagram of a portion of a wireless network system where the slaves return to the first communication resource after terminating communication on the second communication resource in accordance with the present invention.

Referring to FIG. 7, the slave 1 requesting the high speed link to at least another slave (slave 12) now communicates with slave 12 on the second communication resource while the master remains on the first communication resource communicating with other slaves on the network (not shown, but see FIG. 2). Slaves 1 and 12 are now considered "parked" at the first communication resource with respect to the master while the slaves communicate on the second communication resource amongst each other. FIG. 8 shows slave 12 acknowledging the call of slave 1 at the second communication resource (F2). To preferably remain compatible with Bluetooth 1.0, the slaves 1 and 12 return to the second communication resource periodically for synchronization as would a parked slave operating under Bluetooth 1.0. In other words, the master continues to poll the slave talk group on a first communication resource at the re-polling interval, wherein the slave talk group reverts to the first communication resource at the re-polling interval. When one of the slaves wishes to terminate communication with another slave as shown in FIG. 9, the slave (1 in this instance) desiring such termination will send notice on the second communication resource to the other slave (12). The other slave 12 would then send a final acknowledgement to slave 1 on the first communication resource as shown in FIG. 10 before the slaves terminating communication return to the first communication resource as shown in FIG. 11. It should be understood that any slave in the slave talk group (1 or 12 in this instance) can request to terminate communication with another slave within the slave talk group. FIG. 11 also shows the master 2 polling at a re-polling interval (P2) the first slave 1 and at least the second slave 12, which inform the master that communication between the first slave and at least the second slave is terminated. These slaves would be requesting to be unparked by the master and thus confirming their return to communication on the first communication resource.

The steps represented in FIG. 11 can occur in several ways. In one instance, after at least one of the members of the slave talk group requests a call termination of another member of the slave talk group on the second communication resource and the terminating members of the slave talk group transmit a termination confirmation on the first communication resource, the master confirms a termination of communication among the slave talk group while polling the first communication resource at the re-polling interval (P2). Alternatively and preferably done to maintain compatibility, the master confirms termination of communication among the slave talk group when the master polls the slave talk group at the re-polling interval by sending a broadcast directing predetermined members of the slave talk group to transmit on the first communication resource a response. Although the response can include a status update or an acknowledgement (for synchronization purposes for example), preferably the response in this instance is a termination confirmation when at least one of the members of the slave talk group requests a call termination of another member of the slave talk group on the second communication resource and the terminating members of the slave talk group then transmit the termination confirmation.

Figure 12:
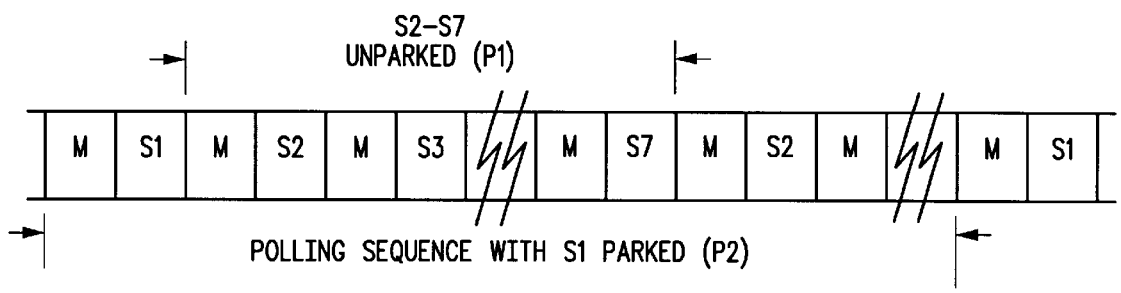
FIG. 12 is a timing diagram illustrating a master and slaves in both a parked and unparked mode in accordance with the present invention.

Referring to FIG. 12, a timing diagram shows a master and slaves in both a parked and an unparked mode in accordance with the present invention. In this case, slave 1 and the master are shown in a parked mode where the interval (P2) the master polls the parked slave 1 is preferably much longer than the interval (P1) to poll an unparked slave such as the interval seen where the master polls slaves 2 through 7.

Figure 13:
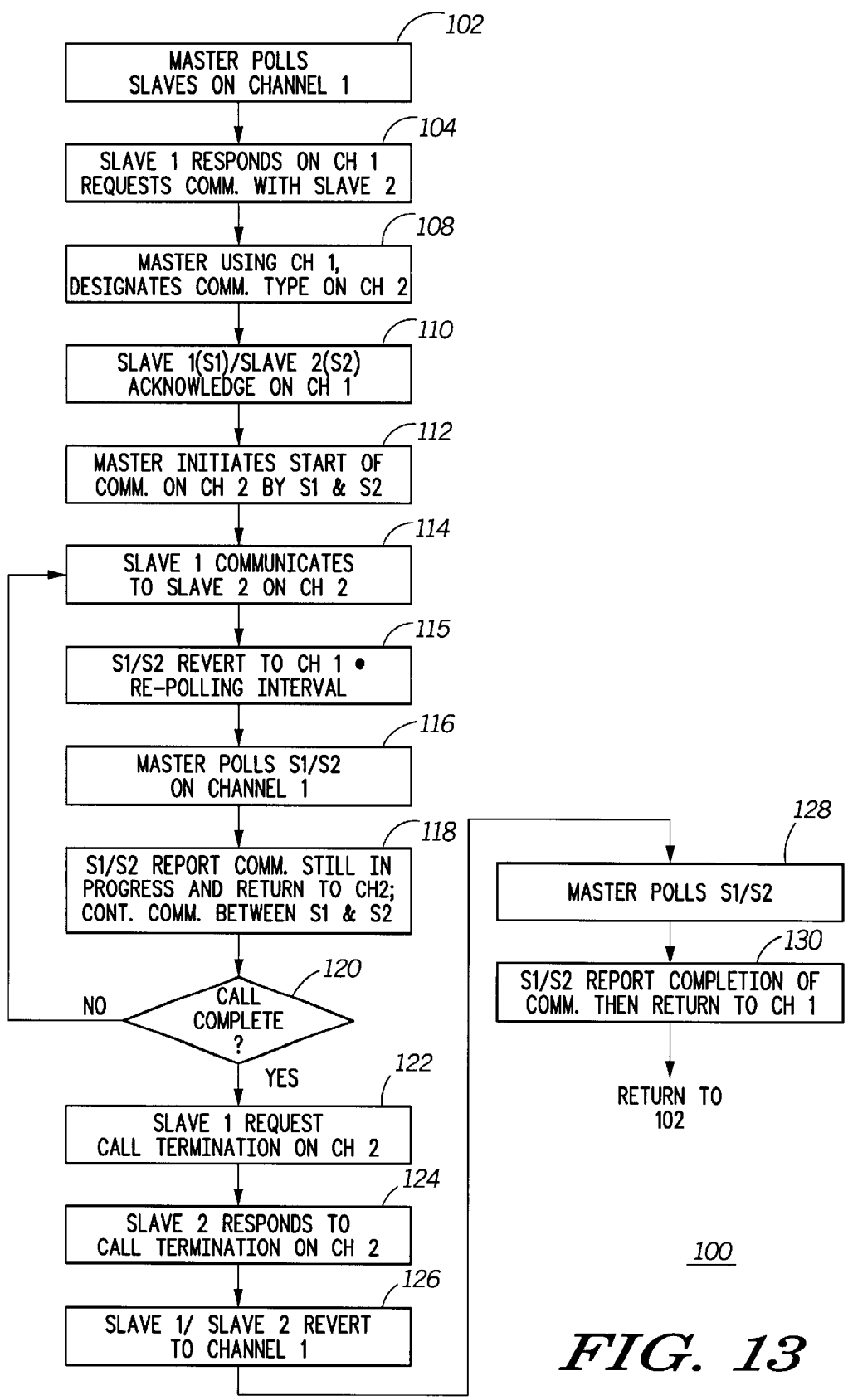
FIG. 13 is a flow chart illustrating a method in accordance with the present invention.

Referring to FIG. 13, a method 100 of dynamic control of talk groups in a wireless network is shown. The wireless network preferably has at least a transceiver operating as a master and a plurality of communication devices operating as slaves to the master where at least one of the communication devices in the plurality of communication devices is a transceiver capable of communication with the master and capable of communication with at least another one of the plurality of communication devices. The plurality of communication devices acting as slaves are preferably transceivers as well, but they can be receivers in certain instances. The method 100 preferably begins with the step 102 of polling by the master at a first interval and on a first communication resource the slaves operating in an unparked mode. At step 104 upon polling the slaves, the master receives a communication request from a first slave of the plurality of communication devices to communicate with at least a second slave of the plurality of communication devices. At step 108, the master designates and transmits a set of communication resource parameters for communication between the first slave and at least the second slave on a second communication resource, wherein the first slave and at least the second slave are now a set of parked slaves in a parked mode. At step 110, the first slave and at least the second slave acknowledge the designation on the first communication resource. Then the master initiates or rather directs on the first communication resource the start of communication between the slaves on the second communication resource at step 112. At step 114, communication commences between the parked slaves on the second communication resource. Since the slaves are parked, they will revert to the first communication resource at the re-polling interval to notify or to confirm to the master the status of their communications and, in particular, the termination of the communication among the parked slaves when the communication is in fact terminated. Thus, at step 116 the master polls the slaves on the first communication resource (or channel 1) to see if communication among the slaves is terminated. At step 118 the slaves revert to the first communication resource periodically at the re-polling interval to give them an opportunity to communicate a termination confirmation to the master. (Of course, the slaves also revert to the first communication resource at the re-polling interval for synchronization purposes as previously described.) At decision block 120, if communication among the slaves is not complete, then the method returns to step 114. If communication among the slaves is terminated, then the first slave will request a call termination on the second communication resource to the second slave at step 122. Slave 2 responds to the call termination on the second communication resource at step 124. At step 126, the slaves revert to the first communication resource to request to be unparked by the master and thus confirming their return to the first communication resource. In other words, the slaves are transmitting while in the parked mode on the first communication resource during a second interval a termination confirmation when at least one of the members of the parked slaves terminates communication with another member of the parked slaves. The method 100 then returns to step 102 whereby the master once again are polled by the master during a first interval on the first communication resource. In this manner, the master and the slaves form a piconet when the master and the slaves are in close proximity and the master creates a slave talk group when placing at least two slaves in a parked mode.

Figure 14:
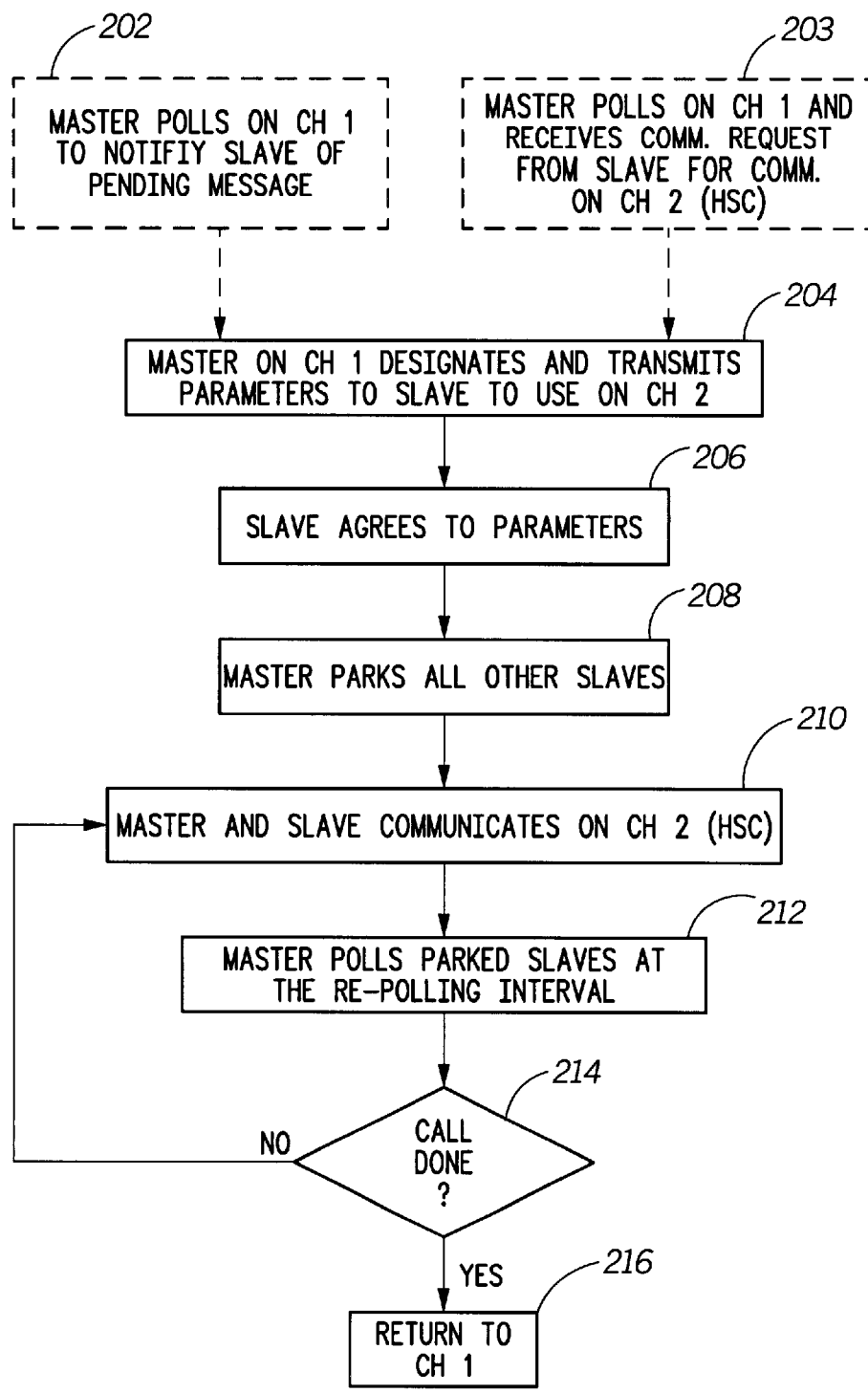
FIG. 14 is flow chart illustrating another method in accordance with the present invention.

Referring to FIG. 14, a method 200 of dynamic control of talk groups in a wireless network is shown. The wireless network preferably has a similar configuration as previously described with regard to FIG. 13, namely a transceiver operating as a master and a plurality of communication devices operating as slaves. In a first alternative of the method 200 where the master wishes to set up communication with a slave, the master at step 202 polls at a first interval and on a first communication resource a slave among the plurality of communication devices operating in an unparked mode to notify the slave of a pending message from the master. Then at step 204, the master designates and transmits a set of communication resource parameters for communication between the master and the slave on a second communication resource. The slave at step 206 would then preferably agree to the communication resource parameters. It should be understood that steps 202 and 204 can be achieved in one transmission by the master where the master notifies the slave of the pending message as well as send designated parameters all in one step. The master at step 208 parks a remainder of the plurality of communication devices while the slave and master communicate on a second communication resource during step 210. Preferably, the slave and master communicate on a high speed channel. The remainder of the plurality of communication devices are now a set of parked slaves in a parked mode. The master at step 212 now polls at the second interval on the first communication resource the parked slaves to service the parked slaves. Once the communication between the master and slave is done at decision block 214, the master and slave return to the first communication resource at step 216. Otherwise, the communication continues between the master and slave.

Figure 15:
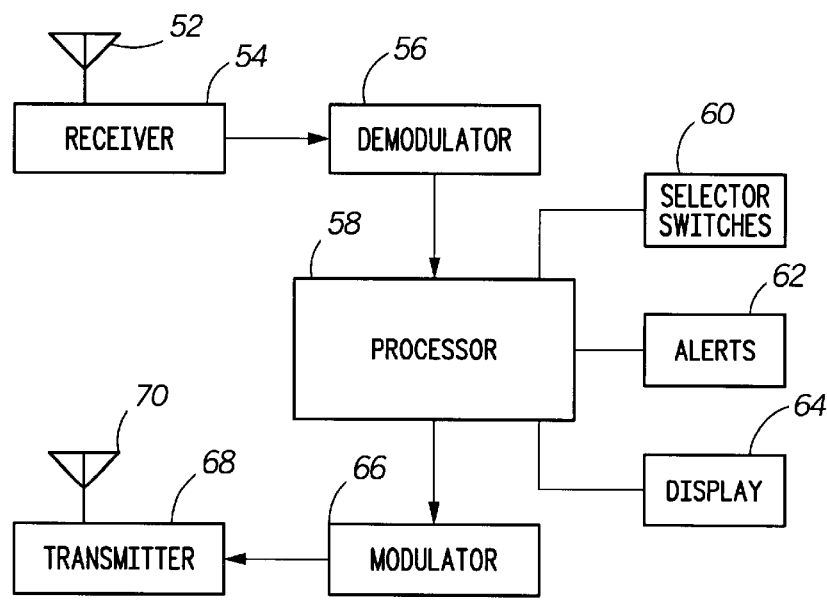
FIG. 15 is a block diagram of a transceiver in accordance with the present invention.

In a first alternative of the method 200 where the slave wishes to set up communication with a master, the master at step 203 polls the first communication resource and receives from a slave a request for communication on a second communication resource such as a high speed channel operating at 5.8 GHz. The master and slave would then follow the steps 204–216 as described above. Referring to FIG. 15, a transceiver device 50 is shown acting as a master among a plurality of communication devices potentially acting as slaves to the master. The transceiver device 50 preferably comprises an antenna 70 for transmitting wireless signals that are modulated by a modulator 66 coupled to a transmitter 68. The transceiver also preferably comprises a processor 58 coupled to the transmitter 68 and to a receiver 54 [through the modulator and demodulator]. The transceiver also preferably comprises an antenna 52 coupled to the receiver 54. The receiver may also be coupled to the processor 58 via a demodulator 56 for demodulating the received signals. Additionally, the transceiver device 50 may also comprises input and output devices such as selector switches 60, alerts 62 and display 64. Preferably, the processor 58 is programmed to poll the slaves at a first interval and to receive a communication request from a first slave of the plurality of communication devices to communicate with at least a second slave of the plurality of communication devices when the master polls the slaves. The processor should also preferably be programmed to designate communication parameters for communication between the first slave and at least the second slave and poll at a re-polling interval at a second interval the first slave and at least the second slave to confirm the termination of communication between the first slave and at least the second slave. The second interval or re-polling interval may establish a battery saving period for the plurality of communication devices potentially acting as slaves, particularly when the second interval is longer than the first interval for polling. The processor may likewise be further programmed to operate as previously described with respect to FIGS. 3–13 in accordance with the present invention. It should be understood that although the present invention is described in the context of a Bluetooth system where the master and slave devices are within a predetermined geographic area (10 to 100 meters) or relatively close proximity, the scope of the claims are not necessarily limited to such short range. It should also be understood that a slave within contemplation of the present invention may also be just a receiving device having a receiver coupled to the processor.

Referring again to FIG. 15, the transceiver 50 can also represent a communication device acting as a slave among a plurality of slaves and among a transceiver acting as a potential master to the slave. In this case the processor 58 would preferably be programmed to either: a) transmit a communication request to the potential master during a first polling interval to establish communication between the communication device and at least the first slave and then receive communication resource parameters for communication between the communication device and at least the first slave from the potential master if attempting to initiate communication with at least a first slave among the plurality of slaves; or b) receive communication resource parameters for communication between the communication device and at least the first slave after a transmission by at least the first slave of a communication request to the potential master when the potential master polls the plurality of slaves at the first polling interval if at least the first slave among the plurality of slaves is attempting to initiate communications with the communication device. The processor would then be programmed to communicate under the communication resources parameters with at least the first slave among the plurality of slaves in a parked mode, wherein the parked mode requires the communication device to transmit to the potential master a termination confirmation at a second polling interval that confirms termination of communication with at least the first slave when the communication device terminates communication with at least the first slave.

The above description is intended by way of example only and is not intended to limit the present invention in any way except as set forth in the following claims. It is also contemplated that the steps outlined in methods 100 and 200 in FIGS. 13 and 14 respectively could easily exist in the sequential order shown or in alternative sequences and yet still be understood to be within the scope of the claimed invention. For example, referring to FIG. 14, the master can park all the slaves first and then attempt to transmit parameters to the particular slave with which it wishes to communicate.

What is claimed is:

1. In a communication system having a transceiver acting as a master and a plurality of communication devices each potentially acting as slaves to the master, a method of communication comprising the steps at the master of:

polling the slaves;

upon polling, receiving a communication request from a first slave of the plurality of communication devices to communicate with at least a second slave of the plurality of communication devices;

designating communication resource parameters for communication between the first slave and at least the second slave;

receiving an acknowledgement from the first slave and at least the second slave;

initiating by the master the start of communication between the first slave and at least the second slave, whereby a slave talk group is created; and polling at a re-polling interval the first slave and at least the second slave to provide an opportunity to inform the master of a status of the communication between the first slave and at least the second slave, wherein the master directs the first slave to communicate with at least the second slave on a second communication resource while the master continues to poll the slave talk group on a first communication resource at the re-polling interval, wherein the slave talk group reverts to the first communication resource at the re-polling interval.

2. The method of claim 1 wherein after at least one of the members of the slave talk group requests a call termination of another member of the slave talk group on the second communication resource and the terminating members of the slave talk group transmit a termination confirmation on the first communication resource, the master confirms a termination of communication among the slave talk group while polling the first communication resource at the re-polling interval.

3. The method of claim 1, wherein the master confirms termination of communication among the slave talk group when the master polls the slave talk group at the re-polling interval by sending a broadcast directing members of the slave talk group to transmit on the first communication resource a response selected from the group of responses consisting of a status report, a synchronization signal, and a termination confirmation when at least one of the members of the slave talk group requests a call termination of another member of the slave talk group on the second communication resource and the terminating members of the slave talk group then transmit the termination confirmation.

4. In a communication system having a transceiver acting as a master and a plurality of communication devices each potentially acting as slaves to the master, a method of communication comprising the steps at a slave of:

transmitting a communication request from a first slave of the plurality of communication devices to communicate with at least a second slave of the plurality of communication devices while the master polls the slaves;

receiving communication resource parameters for communication between the first slave and at least the second slave;

transmitting an acknowledgement to the master from the first slave and from at least the second slave;

communicating by the first slave with at least the second slave creating a slave talk group; and transmitting during the re-polling interval a request to terminate communication between the first slave and at least the second slave when the master polls the slaves at the re-polling interval, wherein at the direction of the master the first slave communicates with at least the second slave on a second communication resource while the master polls the slave talk group on a first communication resource at the re-polling interval, the slave talk group temporarily reverting to the first communication resource at the re-polling interval during a parked mode.

5. The method of claim 4, wherein after at least one of the members of the slave talk group requests a call termination of another member of the slave talk group on the second communication resource and the terminating members of the slave talk group transmit a termination confirmation on the first communication resource, the master confirms a termination of communication among the slave talk group while polling the first communication resource at the re-polling interval.

6. The method of claim 4, wherein members of the slave talk group transmit on the first communication resource a termination confirmation at the direction of the master when at least one of the members of the slave talk group requests a call termination of another member of the slave talk group on the second communication resource and when the master polls the slave talk group at the re-polling interval by sending a broadcast signal directing predetermined members of the slave talk group to transmit the termination confirmation on the first communication resource.

7. The method of claim 4, wherein the first slave transmits on the second communication resource a call termination request to at least the second slave and the second slave responds to the call termination on the second communication resource, whereupon the first slave and at least the second slave transmit a termination confirmation on the first communication resource.

8. The method of claim 4, wherein the members of the slave talk group return to an original polling interval that is different from the re-polling interval after termination of communication among the slave talk group.

9. The method of claim 4, wherein the members of the slave talk group return to an original polling interval that polls more frequently than the re-polling interval after termination of communication among the slave talk group.

10. A transceiver device acting as a master among a plurality of communication devices potentially acting as slaves to the master, the transceiver device comprising:
   a transmitter;
   a receiver coupled to the transmitter; and
   a processor coupled to the transmitter and receiver and programmed to:
      poll the slaves at a first interval;
      receive a communication request from a first slave of the plurality of communication devices to communicate with at least a second slave of the plurality of communication devices when the master polls the slaves;
      designate communication parameters for communication between the first slave and at least the second slave; and
      poll at a re-polling interval at a second interval the first slave and at least the second slave to confirm the termination of communication between the first slave and at least the second slave,
   wherein the processor is further programmed to direct the first slave to communicate with at least the second slave on a second communication resource while the master polls the first slave and at least the second slave on a first communication resource at the re-polling interval, wherein the first slave and at least the second slave revert to communication on the first communication resource at the re-polling interval.

11. The transceiver device of claim 10, wherein the first communication resource is a first channel and the second communication resource is a second channel.

12. A communication device acting as a slave among a plurality of slaves and among a transceiver acting as a potential master to the slave, the slave comprising:

a transmitter;
a receiver coupled to the transmitter; and
a processor coupled to the transmitter and receiver and programmed to:
   if attempting to initiate communication with at least a first slave among the plurality of slaves, then transmit a communication request to the potential master during a first polling interval to establish communication between the communication device and at least the first slave and then receive communication resource parameters for communication between the communication device and at least the first slave from the potential master; or
   if at least the first slave among the plurality of slaves is attempting to initiate communications with the communication device, then receive communication resource parameters for communication between the communication device and at least the first slave after a transmission by at least the first slave of a communication request to the potential master when the potential master polls the plurality of slaves at the first polling interval; and
   communicate under the communication resources parameters with at least the first slave among the plurality of slaves in a parked mode, wherein the parked mode requires the communication device to transmit to the potential master a termination confirmation at a second polling interval that confirms termination of communication with at least the first slave when the communication device terminates communication with at least the first slave,
wherein the communication device communicates with at least the first slave creating a slave talk group after the potential master initiates the start of communication between the communication device and at least the first slave, and further wherein members of the slave talk group transmit on a first communication resource a termination confirmation at the direction of the potential master when at least one of the members of the slave talk group requests a call termination of another member of the slave talk group on a second communication resource and when the potential master polls the slave talk group at the second interval by sending a broadcast signal directing predetermined members of the slave talk group to transmit the termination confirmation on the first communication resource.

13. A communication device acting as a slave among a plurality of slaves and among a transceiver acting as a potential master to the slave, the slave comprising:
   a transmitter;
   a receiver coupled to the transmitter; and
   a processor coupled to the transmitter and receiver and programmed to:
      if attempting to initiate communication with at least a first slave among the plurality of slaves, then transmit a communication request to the potential master during a first polling interval to establish communication between the communication device and at least the first slave and then receive communication resource parameters for communication between the communication device and at least the first slave from the potential master; or
      if at least the first slave among the plurality of slaves is attempting to initiate communications with the communication device, then receive communication resource parameters for communication between the communication device and at least the first slave after a transmission by at least the first slave of a communication request to the potential master when the potential master polls the plurality of slaves at the first polling interval; and communicate under the communication resources parameters with at least the first slave among the plurality of slaves in a parked mode, wherein the parked mode requires the communication device to transmit to the potential master a termination confirmation at a second polling interval that confirms termination of communication with at least the first slave when the communication device terminates communication with at least the first slave, wherein the communication device communicates with at least the first slave creating a slave talk group after the potential master initiates the start of communication between the communication device and at least the first slave, and further wherein the communication device transmits on a second communication resource a call termination request to at least the first slave and the first slave responds to the call termination on the second communication resource, whereupon the communication device and at least the first slave transmit a termination confirmation on a first communication resource.

* * * * *